(12) United States Patent
McKendry et al.

(10) Patent No.: US 6,413,168 B1
(45) Date of Patent: Jul. 2, 2002

(54) ADJUSTABLE LENGTH SHAFT FOR GOLF CLUBS, AND THE LIKE

(75) Inventors: Bruce P. McKendry, Benicia; Lorin P. Olson, Scotts Valley, both of CA (US)

(73) Assignee: L. Jason Clute, Alamo, CA (US)

( * ) Notice: Subject to any disclaimer, the term of this patent is extended or adjusted under 35 U.S.C. 154(b) by 0 days.

(21) Appl. No.: 09/815,190

(22) Filed: Mar. 22, 2001

(51) Int. Cl.[7] .......................... A63B 53/16; F16B 7/10; A63C 11/00; G03B 17/00
(52) U.S. Cl. .................. 473/239; 473/296; 396/419; 403/109.1; 280/823
(58) Field of Search ........................... 473/296, 298, 473/239; 280/819, 823; 403/109, 377, 378, 379, 109.1, 109.3, 109.5, 109.6, 109.8; 396/419, 428, 421, 420

(56) References Cited

U.S. PATENT DOCUMENTS

| | | | |
|---|---|---|---|
| 3,539,185 A | * | 11/1970 | Andis |
| 4,695,021 A | * | 9/1987 | Leinfelder |
| 4,852,782 A | * | 8/1989 | Wu |
| 5,083,779 A | * | 1/1992 | Ungermann |
| 5,169,145 A | * | 12/1992 | Jang |
| 5,275,364 A | * | 1/1994 | Burger |
| 5,282,619 A | * | 2/1994 | Napolitano |
| 5,433,442 A | * | 7/1995 | Walker |
| 5,452,891 A | * | 9/1995 | Thomas |

* cited by examiner

*Primary Examiner*—Stephen Blau
(74) *Attorney, Agent, or Firm*—R. Michael West; Boutin, Dentino, Gibson, Di Giusto, Hodell & West

(57) ABSTRACT

An adjustable length shaft assembly including a handle portion and an extensible shaft. An upper end of the shaft includes a set of locking teeth. The handle has an internal locking mechanism with a tooth rack to accommodate the locking teeth. A control handle is rotated in a first direction, rotating the teeth away from the tooth rack, where the teeth are in a disengaged, unlocked position. With the teeth unlocked, the shaft can be longitudinally adjusted to achieve the desired length. Then, the control handle is rotated in a second direction, rotating the teeth into the tooth rack, where the teeth are in an engaged, locked position. In this manner, the teeth and the tooth rack provide a plurality of positive locking positions, each position providing a different shaft length.

20 Claims, 5 Drawing Sheets

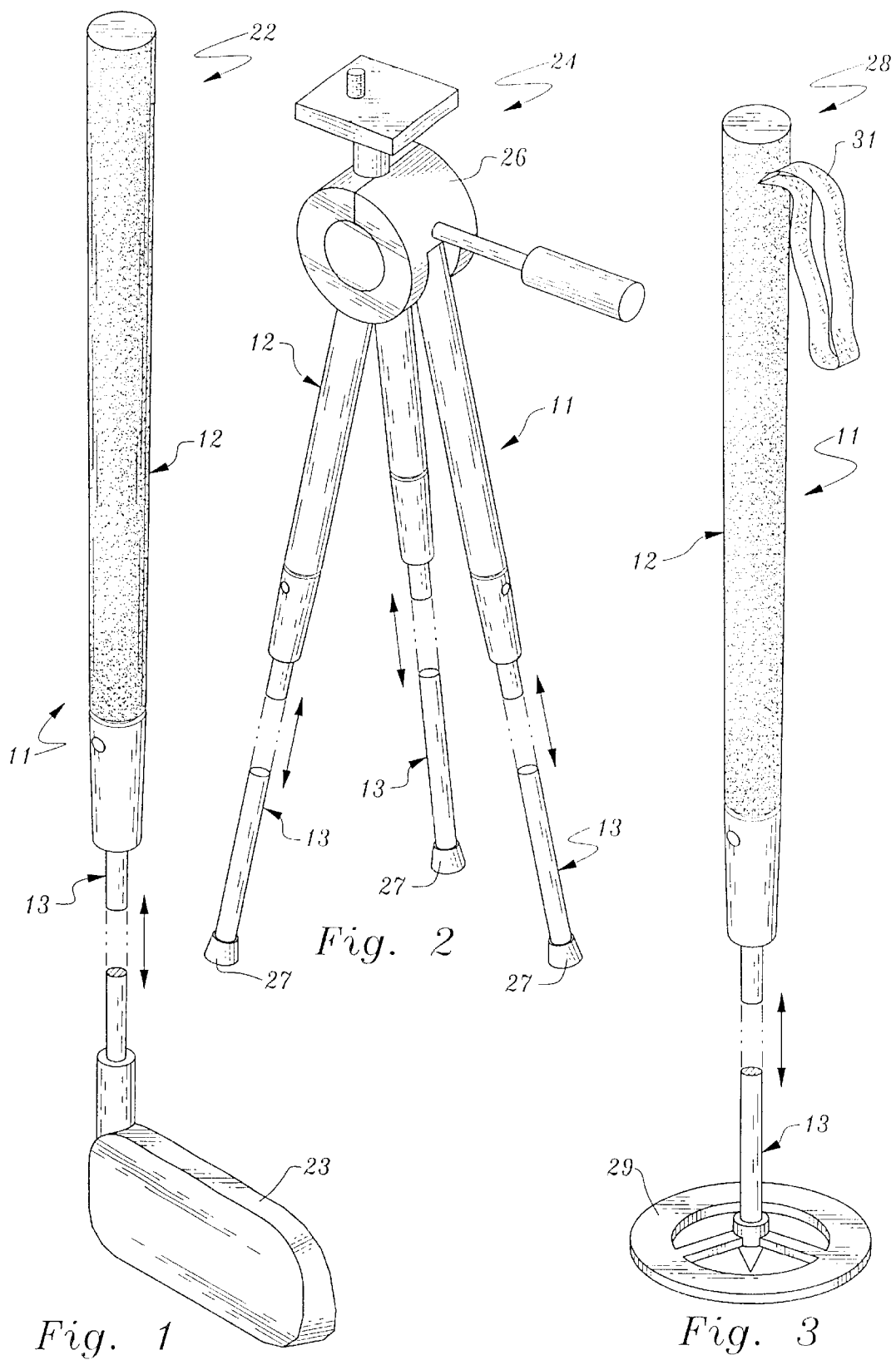

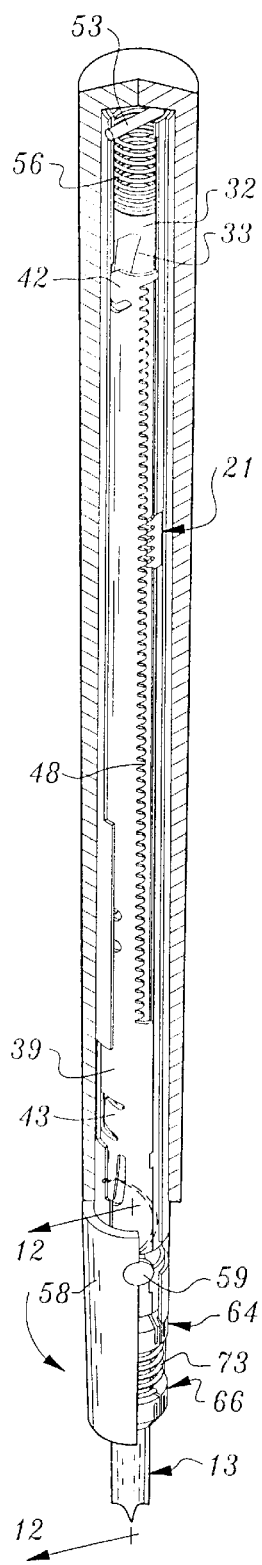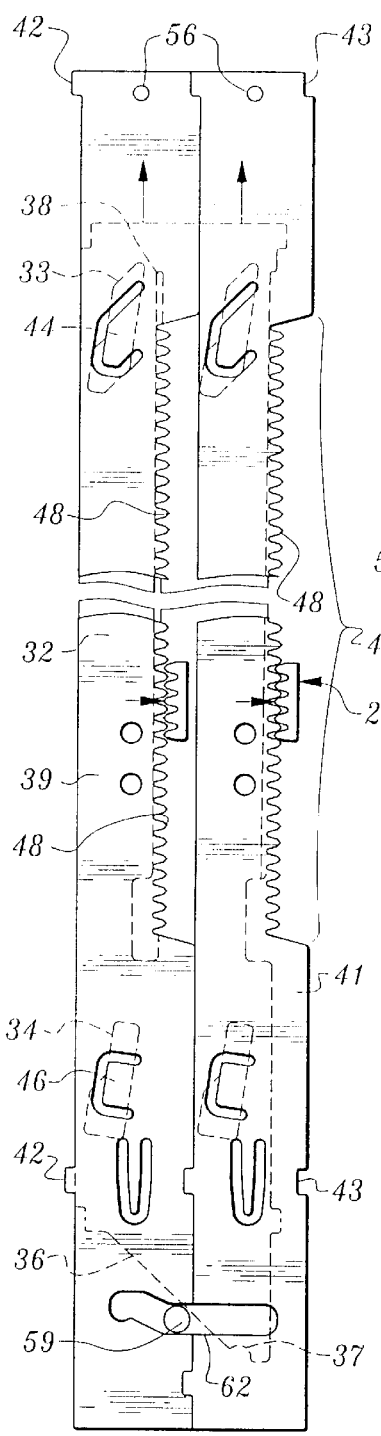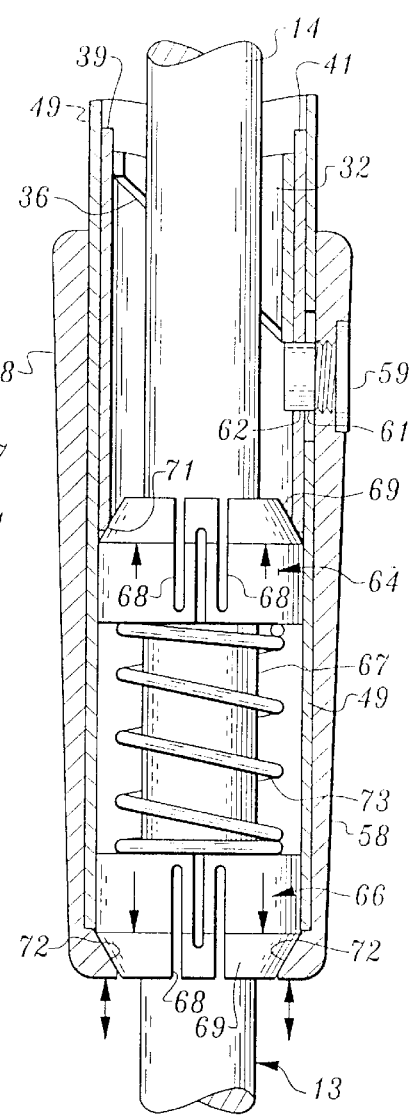
Fig. 10
Fig. 11
Fig. 12

ADJUSTABLE LENGTH SHAFT FOR GOLF CLUBS, AND THE LIKE

BACKGROUND OF THE INVENTION

1. Field of the Invention

The invention relates generally to length-adjustable shafts or poles, for use in a variety of applications, including golf clubs, light stands, music stands, camera tripods, walking sticks, canes, shower curtain rods, ski poles, cleaning implements, and extendible tools. More specifically, the invention pertains to an adjustable length shaft having an internal locking mechanism with teeth and accommodating teeth recesses, the teeth and recesses providing a plurality of positive locking positions, each position providing a different shaft length.

2. Description of the Prior Art

Prior art shafts having adjustable lengths, have been used for many years for a wide variety of applications. Each of these applications has its own functional and aesthetic requirements for the shaft construction which is employed. As a consequence, a number of different mechanisms have been developed to satisfy the particular application requirements.

For example, a telescopic shaft arrangement using a rotatable nut and a compression ring locking mechanism, has been very popular for light duty camera tripods, walking sticks, canes, and extendable poles. An even simpler construction, using a telescopic shaft in combination with a transverse set screw or bolt for compressively locking the shaft, has been used successfully for certain non-demanding applications such as support shafts for music stands and lighting stands. Stronger adjustable length shafts, using a telescopic square tube construction with a flip lever compression lock, have also been developed. These stronger shafts are used for heavier duty tripods, and other applications where the ability to withstand greater axial forces is important. Lastly, a rod construction including a screw-extensible threaded shaft, having a disc foot on its exposed end, has been used for many years as an adjustable support rod for shower curtains.

The above-described prior art constructions have not been used successfully for a number of other demanding applications which could benefit from appropriately featured adjustable length shafts. One of these applications is for adjustable length golf clubs. The reasons are several. Golf clubs must be clean in construction and appearance, to satisfy the consumers' aesthetic requirements. Consequently, flip levers, set screws, and even compression ring mechanisms are not well received for this application. In short, the adjustable length golf club shaft must look substantially identical to a standard fixed length golf club shaft, to be acceptable.

Also, an adjustable length shaft for a golf club must have the same feel as a fixed length shaft, even to be considered by the golfing community. Golfers are notoriously critical and demanding, particularly when it comes to their equipment, so an adjustable shaft that exhibited looseness, lateral play or axial slippage of any sort, would simply be unacceptable.

And, an adjustable length shaft in this application must be both fast and easy to adjust, and positive in its locking capabilities, to be acceptable for golfers. Similar requirements exist for adjustable ski poles, both as to aesthetic and functional aspects.

Thus, the need exists for an improved adjustable shaft construction, which can be used in a variety of fields, and will also satisfy the demanding criteria for golf club and ski pole applications.

SUMMARY OF THE INVENTION

The adjustable-length shaft assembly of the present invention includes a handle and an elongated shaft. The shaft has an upper portion which extends axially within the handle, and is axially adjustable for locking therein. The shaft includes a tooth plate at its upper end. Preferably, two sets of teeth extend from the plate, one on each side of the plate, for more balanced distribution of locking forces and for additional strength. If the shaft assembly is to be used as part of a golf club, a club head is mounted on the lower end of the elongated shaft. For other applications, different articles or other structures may be attached to the shaft or to the handle portion of the assembly.

An elongated, tubular, inner sleeve is located within the handle, surrounding the upper portion of the shaft. The sidewall of the inner sleeve includes upper and lower pairs of cam surfaces, on opposing sides of the inner sleeve. The sidewall cam surfaces resemble a dog-leg, or a dual angled slot, in configuration. These cam surfaces progress from a lower left-hand end upwardly to an upper right-hand end. The inner sleeve also includes an angled cam surface at its lower end. The lower end cam surface extends on a straight angle, from an upper left-hand position downwardly toward a lower right-hand position. A pin detent is provided adjacent the lower right-hand position.

Lastly, the inner sleeve includes a pair of opposing longitudinal tooth plate slots, each approximately 90 degrees rotated from the sidewall cams, and extending generally the same distance between them. The longitudinal plate slots accommodate both sides of the tooth plate, so as to allow sliding of the plate and axial adjustment of the shaft within the inner sleeve. However, the sides of the longitudinal slots restrict any rotational movement of the shaft, relative to the sleeve.

The handle portion of the shaft assembly also includes a tubular housing, positioned about the inner sleeve. The housing is comprised of a left hand shell and a right hand shell. Each shell includes upper and lower cam followers which engage a respective sidewall cam surface of the inner sleeve. Each shell further includes an elongated tooth slot in its sidewall portion. Each tooth slot has a tooth rack extending along one side. The tooth slots have a transverse dimension which is sufficient to accommodate sliding of the tooth plate when it is rotated into an unlocked position.

A tubular outer sleeve is also provided around the housing. The outer sleeve includes sidewall recesses which are engaged by locking fingers, extending slightly outwardly from the sidewalls of each of the shells of the housing. In this way, the outer sleeve acts to hold the two shells together, and to prevent them from rotating.

A blocking pin is transversely positioned across the upper ends of the outer sleeve and the housing. Holes are provided in the sidewalls of the outer sleeve and the housing for securing the pin in place. A cam-bias spring is located within the upper end of the housing. The spring is captive between the upper end of the inner sleeve and the blocking pin, providing a downward bias force against the inner sleeve.

A tubular control handle is located about the lower portion of the outer sleeve. The control handle includes a cam pin extending inwardly toward the inner sleeve, passing first through a transverse cutout in the lower end of said outer sleeve and then through a housing cam in the lower end of the housing. The cam pin thereby engages the angled cam surface at the lower end of the inner sleeve. The cam pin detent at the lower end of the angled cam surface secures the cam pin and the control handle in an unlocked position, so the shaft can be axially adjusted to set the proper length for the shaft assembly.

Upper and lower plastic brake rings surround a lower portion of the shaft, within the confines of the control handle. The brake rings include partial gaps in their sidewalls, so that axial forces applied to the end of either brake causes the ring to compress radially upon the shaft and lock it in place. The upper end of the upper brake ring impinges upon the lower edge of the housing. The lower end of the lower brake ring nests against an annular, angled wall of the control handle. A brake spring between the two rings maintains them in spaced relation, and transmits axial forces between the upper ring and the lower ring.

To change the effective length of the shaft assembly, the control handle is rotated in a clockwise direction, in relation to the outer sleeve and the housing. This moves the cam pin along the angled cam surface of the inner sleeve and along the housing cam surace. This urges the inner sleeve upwardly, causing the upper cam surface of the inner sleeve to rotate the inner sleeve and the teeth on the end of the shaft, away from the housing and the teeth rack. The spring at the upper end of the housing becomes increasingly compressed. Continued clockwise rotation causes the teeth and the tooth rack entirely to disengage, as the cam pin engages the cam pin detent in the inner sleeve. Concurrently, the cam pin moving against the downwardly directed housing cam surface urges the control handle downwardly with respect to the lower end of the handle. This releases compressive forces on the brake spring and axial forces on the brake rings, thereby freeing the shaft. The shaft may now be moved axially, upwardly or downwardly, until the shaft assembly assumes the desired overall length.

To lock the shaft assembly, the control handle is rotated counter-clockwise in relation to the outer sleeve and the housing. As the cam pin disengages from the detent, the angled surface of the inner sleeve, under downward forces from the cam-bias spring at the upper end of the housing, begins to move downwardly in relation to the housing. Under this downward motion, the upper and lower cam surfaces of the inner sleeve in conjunction with the cam followers on the housing, cause the teeth protruding from the inner sleeve to rotate toward the tooth rack on the housing. As rotation of the control handle continues, the teeth mesh with the tooth rack, locking the shaft against axial movement. Concurrently, the cam pin moving against the upwardly directed housing cam surface, moves the control handle upwardly. This compresses the brake spring, imposing greater axial forces on the brake rings. The brake rings compress on the shaft, further preventing axial or lateral movement of the shaft. A locking detent in the extreme counter-clockwise end of the housing cam surface locks the cam pin securely in place.

BRIEF DESCRIPTION OF THE DRAWINGS

FIG. 1 is a right front perspective of a golf club, incorporating the length-adjustable shaft of the present invention;

FIG. 2 is a perspective view of a camera tripod, incorporating the length-adjustable shaft of the present invention;

FIG. 3 is a perspective view of a ski pole, incorporating the length-adjustable shaft of the present invention;

FIG. 10 is a view as in FIG. 5, but showing the control handle mid-way between a locked and an unlocked position;

FIG. 11 is a view as in FIG. 6, but showing the control handle pin mid-way between a locked and an unlocked position;

FIG. 12 is a fragmentary, longitudinal, cross-sectional view, taken on the line 12—12 in FIG. 10;

DETAILED DESCRIPTION OF THE PREFERRED EMBODIMENT

Figure 4:
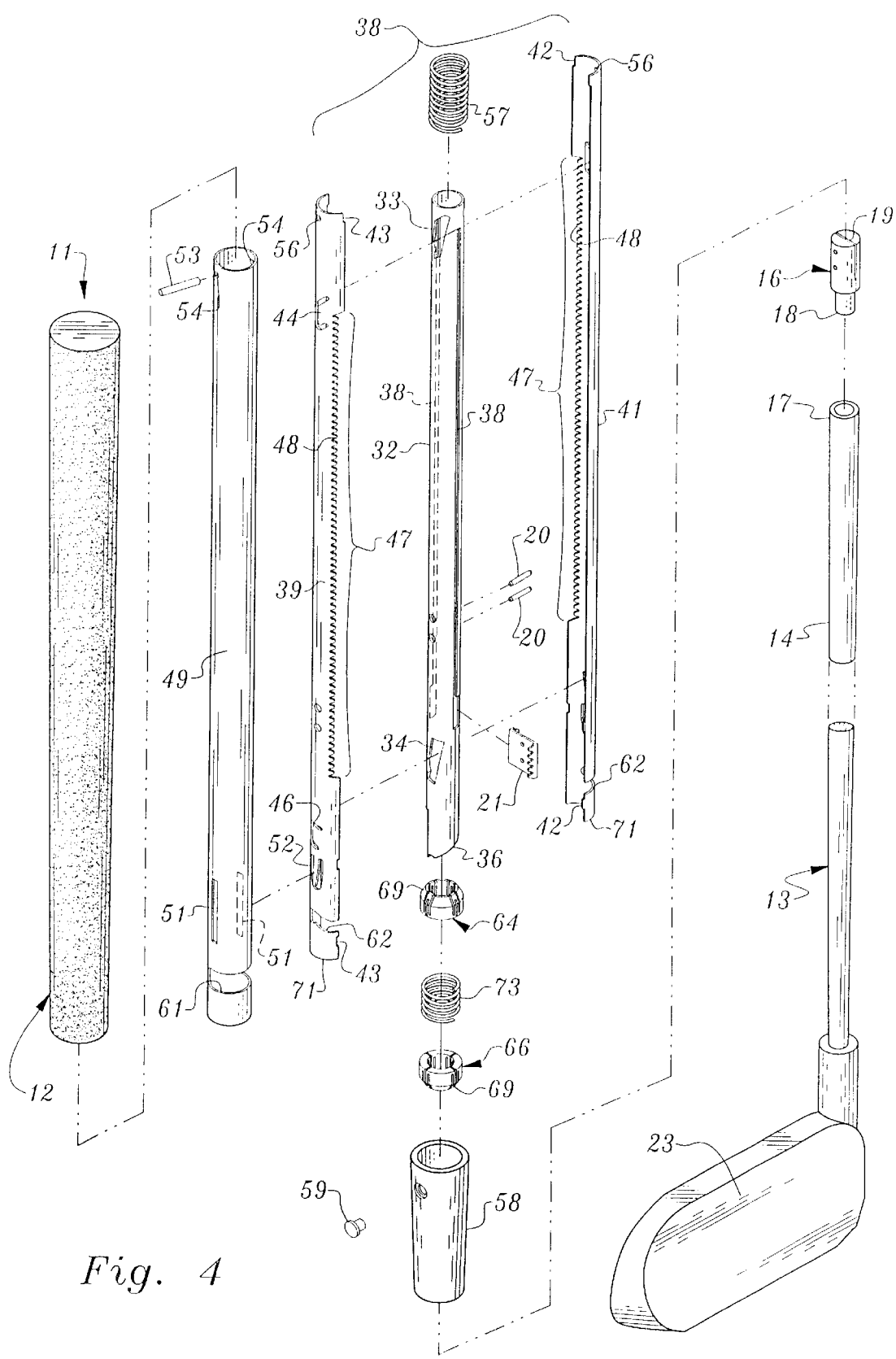
FIG. 4 is an exploded left front perspective of the golf club of FIG. 1.
Figure 5:
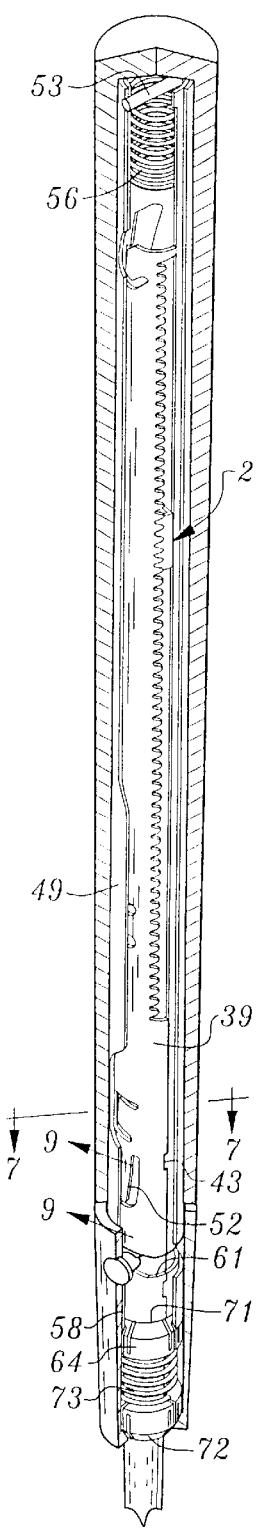
FIG. 5 is a fragmentary cross-sectional view of the grip and the control handle, showing the control handle in a locked position.
Figure 8:
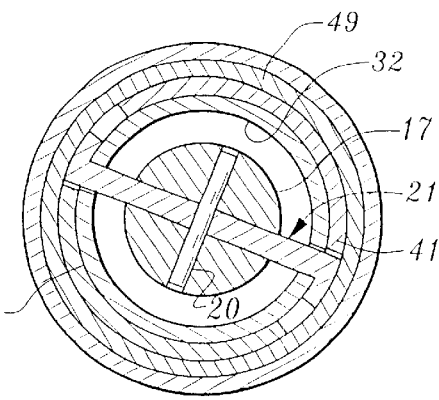
FIG. 8 is a transverse, cross-sectional view, taken on the line 8—8 in FIG. 13.

Turning now to the drawings, the adjustable-length shaft assembly 11 of the present invention includes a handle 12 and an elongated shaft 13. The shaft 13 has an upper portion 14 which extends axially within the handle, for adjustment to the desired position before it is locked securely therein. The shaft 13 includes a plug 16 at its upper end 17. Plug 16 has a reduced diameter section 18 at its lower end, for insertion within upper end 17. The upper end of plug 16 includes a rectangular slot 19, passing through the axis of plug 16 and extending from one side of the plug to the other. The slot 19 is sized to accommodate a tooth plate 21. The tooth plate 21 is secured within the slot by means of a pair of press-fitted pins 20, passing transversely through the split portions of the plug and the plate therebetween. Preferably, tooth plate 21 includes two sets of locking teeth, one set extending from each side of the plate. (See, FIGS. 4 and 8) The sets of locking teeth extend perpendicularly from the plate, in opposing directions. As will be more apparent herein, using two sets of locking teeth provides a more balanced distribution of locking forces and additional strength.

If the adjustable length shaft assembly is to be used as part of a golf club 22, an iron or wood club head 23 is secured to the lower end of the elongated shaft 13. Handle 12 may include a resilient gripping material on its outer surface, consistent with conventional golf club construction. For this application, an adjustable length shaft allows younger golfers initially to use full size clubs with a reduced length shaft, and then later, the shaft length may be extended to whatever length is appropriate. The adjustable length shaft may also be used for training or practice, and to determine experimentally the golf club shaft length which works best for a given golfer for a particular golfing situation.

However, the shaft assembly 11 may also be used advantageously for many other applications, where the need for an adjustable length shaft exists. In these circumstances, different articles or other structures may be attached either to the shaft 13 or to the handle portion 12 of the assembly. For example, in FIG. 2, showing a camera tripod 24, the upper end of the handle 12 is attached to a tripod head 26. And, leg tips 27 may be fitted on the lower ends of the shafts 13. In this application, the shaft assembly 11 is used in the same fashion as prior art adjustable shafts, namely, to provide adjustable tripod legs which can be collapsed for storage and transport and extended to a selected height for use.

Similarly, in FIG. 3, showing a ski pole 28, a basket 29 is preferably attached to the lower end of the shaft 13. A hand strap 31 may also be affixed to the upper end of handle 12. As with the adjustable shaft golf club, the adjustable shaft ski pole may be used by younger skiers. Also, during different snow or hill conditions, an experienced skier may want to adjust the length of his or her ski poles accordingly. It is apparent that other applications exist for the adjustable length shaft assembly 11, as discussed in more detail above.

Returning now to FIG. 4, an elongated, tubular, inner sleeve 32 is located within the handle, surrounding the upper portion 14 of the shaft 13. The sidewall of the inner sleeve 32 includes an upper cam surface 33 and a lower cam surface 34, on opposing sides of the sleeve 32. Sidewall cam surfaces 33 and 34 resemble a dog-leg, or a dual angled slot, in configuration. These cam surfaces progress upwardly from a lower left-hand end, and then transition, more vertically, to reach an upper right-hand end. This stepped, cam surface configuration effects different rates of movement between certain locking components of the shaft assembly 11.

The inner sleeve 32 also includes an angled cam surface 36, at its lower end. Cam surface 36 extends on a helical path, from an upper left-hand position downwardly toward a lower right-hand position, as viewed, for example, in FIG. 6. A pin detent 37 is provided adjacent the lower right-hand position. As will be explained below, detent 37 secures certain structures of the assembly 11 in an unlocked position, while the user adjusts the shaft 13 into the desired axial position.

The inner sleeve 32 further includes a pair of opposing, longitudinal tooth plate slots 38, each approximately 90 degrees rotated from the sidewall cams, and extending generally to the same longitudinal extent. Each of the tooth plate slots 38 accommodates a respective side of the tooth plate 21, so as to allow free longitudinal sliding of the plate 21 and corresponding axial adjustment of the shaft 13 within the inner sleeve 32. However, it should be noted that the lateral sides of the longitudinal slots 38, restrict any rotational movement of the plate 21 or the shaft 13 to which it is attached, with respect to the inner sleeve 32.

The handle portion 12 of the shaft assembly 11 also includes a tubular housing 38, surrounding inner sleeve 32. Housing 38 has an inner diameter which is just slightly larger than the outer diameter of inner sleeve 32. The housing 38 is preferably comprised of a left hand shell 39 and a right hand shell 41. The shells are secured to each other by means of tabs 42 and respective notches 43. Two shells are used to form the housing 38 because it is easier to assemble the various internal parts of the assembly 11 with the shells temporarily split apart. However, it would also be possible to use a single tube for the housing 38 by employing a different method of assembly. Thus, the invention herein contemplates that both the shell and the single tube constructions are structurally and functionally equivalent, and that one of ordinary skill in the art may have design justifications to substitute one for the other.

Each shell includes an upper cam follower 44 and a lower cam follower 46. Each cam follower 44 and 46 is bent slightly inwardly, toward inner sleeve 32. In this manner, the upper cam followers 44 engage respective upper cam surfaces 33 of the inner sleeve 32. Similarly, the lower cam followers 46 engage respective lower cam surfaces 34.

Each shell further includes an elongated tooth slot 47 in its sidewall portion. Each tooth slot has a tooth rack 48 extending along one side. The tooth slots 47 have a transverse dimension which is sufficient to accommodate sliding of the locking teeth of tooth plate 21, when the tooth plate is rotated into a disengaged, unlocked position.

Figure 9:
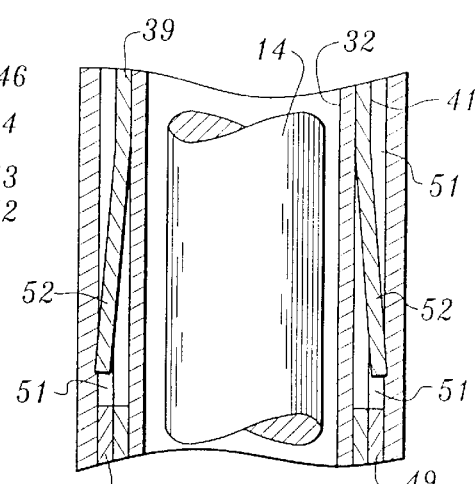
FIG. 9 is a fragmentary, longitudinal, cross-sectional view, taken on the line 9—9 in FIG. 5.

A tubular outer sleeve 49 is provided around the housing 38. Sleeve 49 has an inner diameter which is just slightly larger than the outer diameter of housing 38. On opposing sidewalls of its lower end, the outer sleeve 49 has longitudinally extending sidewall recesses 51. Shells 39 and 41 include locking fingers 52, extending slightly outwardly from the sidewalls of each of the shells. As shown more specifically in FIG. 9, fingers 52 protrude within respective recesses 51. In this manner, fingers 52 cooperate with outer sleeve 49, to hold the two shells together and to prevent them from rotating with respect to each other.

A blocking pin 53 is also provided, transversely spanning the upper ends of outer sleeve 49 and housing 38. Pin 53 is installed in place by press fitting it both through holes 54 in the opposing sidewall portions of sleeve 49, and through holes 56 in shells 39 and 41. A cam-bias spring 57 is provided within the upper end of housing 38. Spring 57 is held captive between the upper end of the inner sleeve 32 and the pin 53, providing a downward bias force against the inner sleeve 32.

A slightly tapered, tubular control handle 58 is located about the lower portion of the outer sleeve 49. The control handle is the portion of the assembly 11 which the user grips and rotates from a locked position to an unlocked position, and then back again, in the course of making shaft length adjustments. The control handle 58 includes a cam pin 59, extending inwardly toward the inner sleeve 32. The cam pin passes first through a transverse cutout 61 in the lower end of said outer sleeve 49, and then through a housing cam 62, in the lower end of the housing 38. A locking detent 63 is provided in the extreme left-handed end of cam 62. Pin 59 is sufficiently long so that its innermost end engages the angled cam surface 36 at the lower end of the inner sleeve 32.

In order to maintain shaft 13 securely within handle 12, an upper brake ring 64 and a lower brake ring 66 are provided. Brake rings 64 and 66 surround a lower portion 67 of the shaft 13, within the confines of the control handle 58. The brake rings may be made from resilient plastic, or other suitable material. The rings include sidewall gaps 68, so that converging and opposing axial forces applied to the chamfered ends 69 of brakes cause the rings radially to compress upon the shaft and lock it in place. It will be noted that the upper end of the upper brake ring 64 impinges upon a lower chamfered edge 71 of the housing 38. And, the lower end of the lower brake ring 66 nests against an annular, angled wall 72 of the control handle 58. A brake spring 73 between the two rings maintains them in spaced relation, and transmits axial forces between the upper and lower rings.

Figure 6:
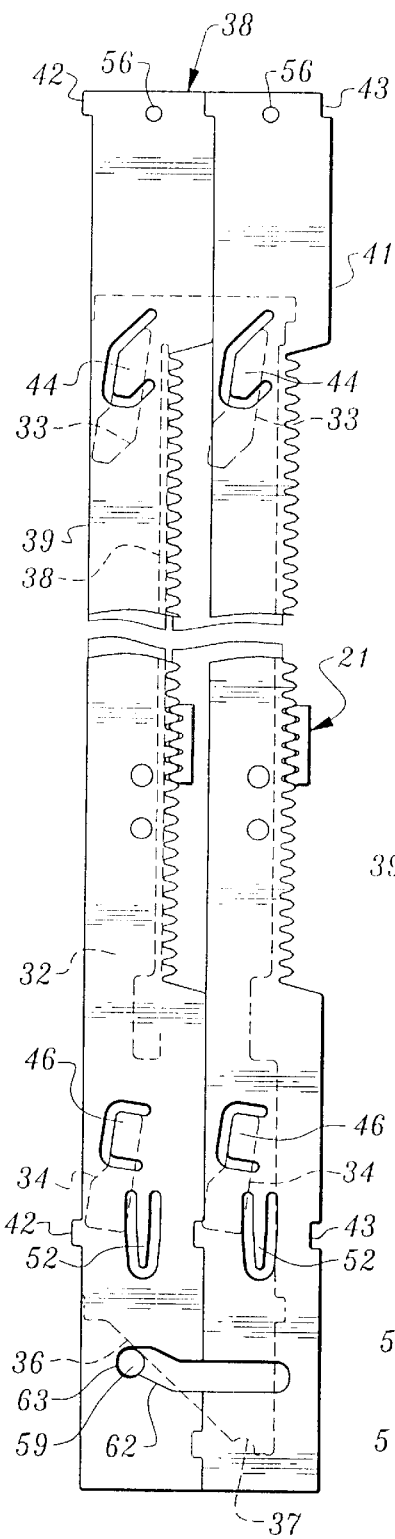
FIG. 6 is a laid-out side elevational view of the left hand and right hand shells of the housing, showing the control handle pin in a locked position, and the outline of the laid-out inner sleeve being shown in broken line.
Figure 7:
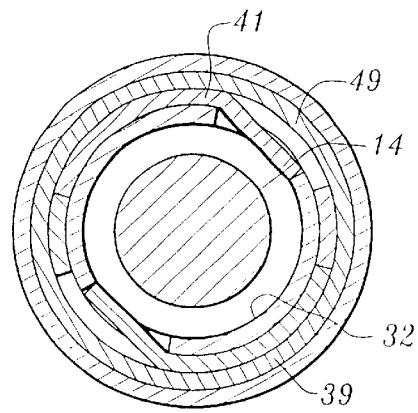
FIG. 7 is a transverse, cross-sectional view, taken on the line 7—7 in FIG. 5.

When the control handle 58 is rotated to an extreme lefthand position, as shown for example in FIG. 6, the shaft 13 is locked securely within handle 12. The cam pin 59 is secured within locking detent 63, and the inner sleeve 32 has translated downwardly, into a lowered position. This occurs because the angled cam surface 36 rides downwardly over pin 59, urged by the cam bias spring 57. Upper cam followers 44 are located within the upper ends of upper cam surfaces 33, and lower cam followers 46 are located within the upper ends of upper cam surfaces 34. The locking teeth on tooth plate 21 are rotated into engagement with respective portions of the tooth racks 48, securely locking the shaft against any axial movement, with respect to the handle 12.

With the control handle in a locked position, the control handle 58 is also in a fully raised position. This occurs because the upwardly directed left hand end of the housing cam 62 lifts, or moves the control handle upwardly, with respect to the housing. This effects greater compression of brake spring 73, causing brake rings 64 and 66 to clamp down on the lower portion 67 of the shaft. The brake rings provide a considerable measure of lateral support, to eliminate slop or play between shaft 13 and handle 12. The brake rings also provide additional resistance to any axial movement of the shaft.

To change the effective length of the shaft assembly 11, the control handle 58 is first rotated toward the right, into an intermediate position, as shown in FIG. 11. With the cam pin 59 now sliding against the angled cam surface 36 of the inner sleeve 32, the inner sleeve is urged upwardly. This causes upper cam followers 44 to slide downwardly with respect to upper cam surfaces 33. Although lower cam followers 46 are also caused to slide downwardly, there is no surface within the lower right-hand cutout of lower cam surfaces 34 for the followers 46 to engage. Thus, only the upper cam followers 44 and upper cam surfaces 33 are effective to provide relative rotational movement between the housing 38 and the inner sleeve 32 in this unlocking process.

The locking teeth on tooth plate 21 are rotated partially out of engagement with respective portions of the tooth rack 48. The cam pin 59 is now removed from the locking detent 63, and the control handle, following the downward contour of the housing cam, also moves downwardly with respect to the handle. This causes brake spring 73 to decompress, substantially relieving axial forces imposed upon ring brakes 64 and 66 and effecting release of the shaft.

Figures 13, 14, 15:
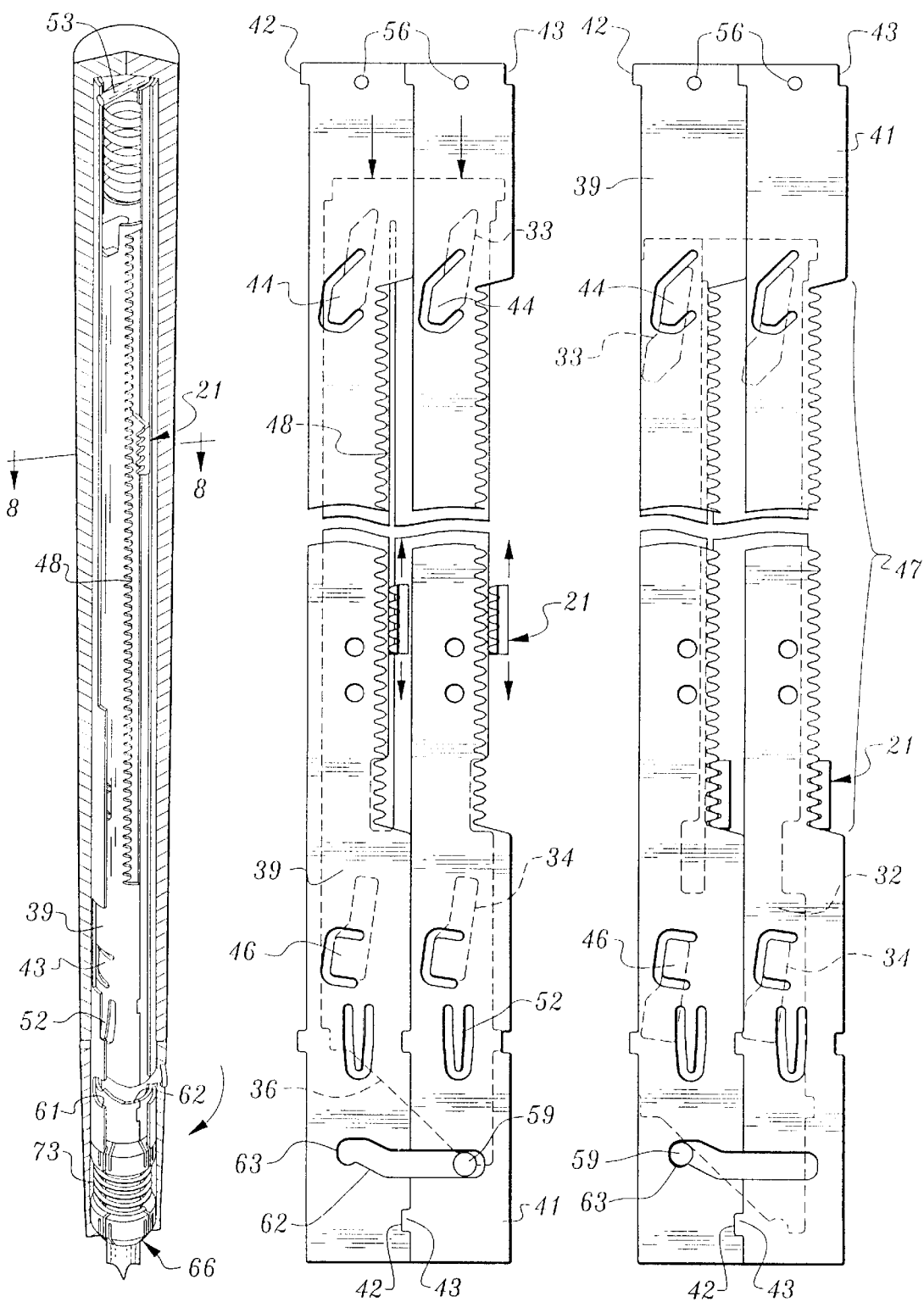
FIG. 13 is a view as in FIG. 5, but showing the control handle in an unlocked position.
FIG. 14 is a view as in FIG. 6, but showing the control handle pin in an unlocked position; and, FIG. 15 is a view as in FIG. 11, but showing the control handle pin in a locked position with the shaft fully extended.

Continued rotation of the control handle 58, to an extreme right handed position, completes the shaft unlocking process. As shown in FIG. 14, the cam pin 59 has raised the inner sleeve 32 to its highest position, and pin 59 now rests in pin detent 37. With inner sleeve 32 fully raised, upper cam followers 44 now reside in the lower ends of upper cam surfaces 33, and lower cam followers 46 reside in the lower ends of lower cam surfaces 34. The locking teeth on tooth plate 21 are now rotated fully out of engagement with the tooth rack 48. Because the compressive forces on the brake spring and the axial forces on the brake rings remain relieved, the shaft may now be moved axially, upwardly or downwardly, until the shaft assembly 11 assumes the desired overall length. (See, e.g., the movement shown in FIG. 14).

The above-recited procedure is simply reversed to lock the shaft in its new, selected position. The control handle 58 is rotated toward the left, moving the cam pin 59 into the intermediate position shown in FIG. 11. With the cam pin dislodged from pin detent 37, inner sleeve 32 moves downwardly, with respect to housing 38. This causes upper cam follower 44 and lower cam follower 46 to slide upwardly within respective cam surfaces 33 and 34. It should be noted that in this locking process, both the upper and lower cam surfaces are operative, whereas in the unlocking process, only the upper cam surfaces are operative.

Because cam surfaces 33 and 34 are stepped, having different angles of inclination, the relative rotational movement between the housing 38 and the inner sleeve 32 takes place at different rates. During the first phase of the rotation, the rate is relatively quick, effected by the lower portions of stepped cam surfaces 33 and 34. This is effective to rotate tooth plate 21 substantially into engagement with tooth rack 48. During the second phase of rotation, the rate of rotation is slower, as the upper portion of cam surfaces 33 and 34 is more steeply vertically inclined, effecting less rotational displacement for a given extent of travel. This more gradual rotational rate is effective to mesh the teeth of tooth plate 21 securely within the complementary recesses of tooth rack 48.

Moreover, this phase of the locking process is characterized by the upward travel of the pin 59 within housing cam 62. This raises control handle 58 with respect to housing 38, re-compressing upper and lower brake rings 64 and 66, in the same manner and with the same result, as that previously described. Continued rotation of the control handle 58 finally registers cam pin 59 within locking detent 63. Now the shaft 13 is securely locked in its new position. Had the user previously adjusted the assembly 11 to its maximum length, the tooth plate 21 would now be positioned within the lowermost part of tooth slot 47, as shown in FIG. 15.

What is claimed is:

1. An adjustable shaft assembly, comprising:
  a. an elongated shaft, having a lower end and an upper end, and including at least one locking tooth extending transversely from said upper end;
  b. a handle, said handle including: inner sleeve means, positioned about an upper portion of said elongated shaft, allowing longitudinal sliding adjustment of said shaft and said locking tooth within said inner sleeve when said tooth is in a disengaged, unlocked position; housing means positioned about said inner sleeve means, said housing means including a tooth rack; and, an outer sleeve positioned about said housing means; and,
  c. control handle means positioned about a lower end of said outer sleeve, said control handle means being rotatable in a first direction, for rotating said locking tooth into a disengaged, unlocked position from said tooth rack thereby allowing longitudinal adjustment of said shaft, and said control handle means being rotatable in a second direction, for rotating said locking tooth into an engaged, locked position with said tooth rack, thereby restraining longitudinal movement of said shaft.

2. An apparatus as in claim 1, further including at least one shaft brake within said control handle means and positioned over said shaft, said control handle means and said shaft brake having mating, inwardly inclined cam surfaces so that when said cam surfaces are urged together, said shaft brake provides radially compressive locking forces on said shaft.

3. An apparatus as in claim 2, including an upper shaft brake and a lower shaft brake within said control handle means, said upper shaft brake and said lower shaft brake having opposing ends and further including spring bias means between said opposing ends, and in which said lower shaft brake has an inwardly inclined cam surface mating with said cam surface on said control handle and said upper shaft brake has an inwardly inclined cam surface in contact with a lower end of said housing means.

4. An apparatus as in claim 1, further including brake means to restrain lateral and axial movement of said shaft within a lower end of said housing means and said control handle means.

5. An apparatus as in claim 1, further including detent locking means, for selectively locking said control handle means against rotation, when said tooth is in said disengaged, unlocked position and when said tooth is in said engaged, locked position.

6. An apparatus as in claim 1, including at least two locking teeth, each of said teeth extending transversely from said upper end of said shaft in opposing directions, and in which said housing means includes two teeth racks for engagement by a respective one of said locking teeth.

7. An apparatus as in claim 1, in which said handle is comprised of a resilient grip material, and in which a golf club head is attached to said lower end of said shaft.

8. An apparatus as in claim 1, in which said handle is comprised of a resilient grip material, and in which a ski pole basket is attached to said lower end of said shaft.

9. An apparatus as in claim 1, further including a camera tripod head attached to an upper end of said handle.

10. An apparatus as in claim 9, further including three of said adjustable shaft assemblies, and in which said tripod head is attached to said upper ends of said handles, of each of said shaft assemblies.

11. An adjustable shaft assembly, comprising:
   a. an elongated shaft, having a lower end and an upper end, and including at least one locking tooth extending transversely from said upper end;
   b. an inner sleeve positioned about an upper portion of said elongated shaft, said inner sleeve including at least one sidewall cam surface and a lower end cam surface, said sidewall cam surface having a configuration progressing from a lower left-hand position to an upper right-hand position, and said lower end cam surface having a configuration progressing from an upper left-hand position to a lower right-hand position, said sleeve further including a longitudinal slot for accommodating said tooth of said shaft, said slot being sized so as to allow longitudinal sliding adjustment of said tooth within said inner sleeve, but restraining any rotational movement of said tooth therein;
   c. a housing positioned about said inner sleeve, said housing including a cam follower engaged with said sidewall cam surface of said inner sleeve, and further including an elongated slot in a sidewall portion of said housing, said slot having a tooth rack extending along one side thereof, said slot being sized to accommodate sliding of said tooth in an unlocked position;
   d. an outer sleeve positioned about said housing, said outer sleeve having an upper end and including a transverse pin at said upper end;
   e. spring bias means located between an upper end of said inner sleeve and said upper end of said outer sleeve, for providing a downward bias force against said inner sleeve; and,
   f. a rotatable control handle positioned about a lower end of said outer sleeve, said handle including a cam pin extending inwardly toward said inner sleeve, said cam pin passing through a transverse cutout in a lower portion of said housing, said cam pin thereby engaging said lower end cam surface of said inner sleeve.

12. An apparatus as in claim 11, further including at least one shaft brake within said control handle and positioned over said shaft, said control handle and said shaft brake having mating, inwardly inclined cam surfaces so that when said cam surfaces are urged together, said shaft brake provides radially compressive locking forces on said shaft.

13. An apparatus as in claim 12, including an upper shaft brake and a lower shaft brake within said control handle, and further including spring bias means between opposing ends of said upper and lower shaft brakes, and in which said lower shaft brake has an inwardly inclined cam surface mating with said cam surface on said control handle and said upper shaft brake has an inwardly inclined cam surface in contact with a lower end of said housing.

14. An apparatus as in claim 11, further including brake means to restrain lateral and axial movement of said shaft within a lower end of said housing and said control handle.

15. An apparatus as in claim 11, further including a handle substantially covering an outer portion of said upper sleeve, above said control handle.

16. An apparatus as in claim 15, in which said handle is comprised of a resilient grip material, and in which a golf club head is attached to said lower end of said shaft.

17. An apparatus as in claim 15, in which said handle is comprised of a resilient grip material, and in which a ski pole basket is attached to said lower end of said shaft.

18. An apparatus as in claim 15, further including a camera tripod head attached to an upper end of said handle.

19. An apparatus as in claim 18, further including three of said adjustable shaft assemblies, and in which said tripod head is attached to said upper ends of said handles, of each of said shaft assemblies.

20. An adjustable shaft assembly, comprising:
   a. an elongated shaft, having a lower end and an upper end, and including at least one tooth extending transversely from said upper end;
   b. inner sleeve means, positioned about an upper portion of said elongated shaft, allowing longitudinal sliding adjustment of said tooth within said inner sleeve, but restraining any rotational movement of said tooth therein;
   c. housing means positioned about said inner sleeve means, said housing means including a tooth rack for selective engagement by said tooth;
   d. an outer sleeve positioned about said housing means;
   e. spring bias means located between an upper end of said inner sleeve and said upper end of said outer sleeve, for providing a downward bias force against said inner sleeve; and,
   f. control handle means positioned about a lower end of said outer sleeve, for rotating said tooth on said shaft selectively into and out of engagement with said tooth rack.

* * * * *